United States Patent
Iannaccone (10) Patent No.: US 10,853,428 B2
(45) Date of Patent: Dec. 1, 2020

(54) COMPUTING A RANKED FEATURE LIST FOR CONTENT DISTRIBUTION IN A FIRST CATEGORIZATION STAGE AND SECOND RANKING STAGE VIA MACHINE LEARNING

(71) Applicant: Facebook, Inc., Menlo Park, CA (US)

(72) Inventor: Gianluca Iannaccone, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 130 days.

(21) Appl. No.: 15/650,118

(22) Filed: Jul. 14, 2017

(65) Prior Publication Data
US 2019/0018897 A1    Jan. 17, 2019

(51) Int. Cl.
| | |
|---|---|
| G06Q 30/00 | (2012.01) |
| G06F 16/9535 | (2019.01) |
| G06Q 50/00 | (2012.01) |
| G06Q 30/02 | (2012.01) |
| H04N 21/23 | (2011.01) |

(Continued)

(52) U.S. Cl.
CPC .... G06F 16/9535 (2019.01); G06F 16/24578 (2019.01); G06N 20/00 (2019.01); G06Q 30/0251 (2013.01); G06Q 50/01 (2013.01); H04N 21/23 (2013.01)

(58) Field of Classification Search
None
See application file for complete search history.

(56) References Cited

U.S. PATENT DOCUMENTS

| | | | | |
|---|---|---|---|---|
| 2010/0094863 A1* | 4/2010 | Kenton-Dau | .... | G06Q 10/06375 707/722 |
| 2016/0092938 A1* | 3/2016 | Tang | .................. | G06Q 30/0277 705/14.73 |
| 2018/0284758 A1* | 10/2018 | Cella | .................. | G05B 19/4184 |

FOREIGN PATENT DOCUMENTS

| | | | | |
|---|---|---|---|---|
| JP | 2012173796 A | * | 9/2012 | ............. G06F 17/30 |
| WO | WO-2009087636 A1 | * | 7/2009 | ......... G06F 16/3334 |
| WO | WO-2010044683 A1 | * | 4/2010 | ............. G06Q 10/04 |

OTHER PUBLICATIONS

SAP. Expert Analytics User Guide. (Nov. 22, 2016). Retrieved online Aug. 26, 2020. https://open.sap.com/files/a5ae7e7d-adf1-4df2-bcbc-95b1849302b9 (Year: 2016).*

(Continued)

*Primary Examiner* — James A Reagan
(74) *Attorney, Agent, or Firm* — Fenwick & West LLP (57) ABSTRACT

An online system identifies seed users with a high value score to a third party system. The online system identifies features of each of the seed users. A weight for each of the identified features is identified. The identified features are divided into a plurality of buckets, each bucket indicating a property associated with one or more of the identified features. Each bucket is ranked according to the weights of the identified features in each bucket. The online system identifies an additional user that has a threshold measure of similarity the seed users. The online system transmits a content item to the additional user for presentation. Additionally, the online system transmits one or more third party-presentable factors based on the bucket having the highest rank to the third party system, the third party-presentable factors indicating a reason as to why the additional user was presented with the content item.

20 Claims, 3 Drawing Sheets

(51) Int. Cl.
*G06N 20/00* (2019.01)
*G06F 16/2457* (2019.01)

(56) References Cited

OTHER PUBLICATIONS

Amazon. Amazon Machine Learning Developer Guide. (Apr. 9, 2015). Retrieved online Aug. 26, 2020. https://docs.aws.amazon.com/machine-learning/latest/dg/machinelearning-dg.pdf (Year: 2015).*

Hofmann et al. Online Evaluation for Information Retrieval. (Jul. 1, 2016). Retrieved online Aug. 26, 2020. https://www.microsoft.com/en-us/research/wp-content/uploads/2016/06/ftir-online-evaluation-final-journal.pdf (Year: 2016).*

* cited by examiner

COMPUTING A RANKED FEATURE LIST FOR CONTENT DISTRIBUTION IN A FIRST CATEGORIZATION STAGE AND SECOND RANKING STAGE VIA MACHINE LEARNING

BACKGROUND

This disclosure relates generally to large scale online systems having a large number of users, and specifically to computing a ranked feature list for content distribution in a first categorization stage and second ranking stage via machine learning.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, these online systems provide an ideal forum for entities to increase awareness about products or services by presenting content to online system users.

In these online systems, some content items are provided by third party systems for distribution to users of the online system, and the content is distributed based on an indication by the third party system that the type of users to whom the third party would like the content to be distributed can be generated by the online system. Third party systems may often not know the primary contributing reasons by which particular content items were selected for distribution to particular users. Similarly, users receiving content items may also often not know the primary contributing reasons that they were included in the target group to receive that data. Distribution of content to users is commonly made in online systems via complex models of both internal and external data of the online system, so surfacing such contributing reasons is not a trivial task. Presentation of the raw weights and other data from the models to the third party system or users is likely not sufficient for a full understanding of the primary contributing reasons certain users receive certain content items.

SUMMARY

Embodiments of the invention provide a more streamlined method to extract semantically meaningful data from models used for content distribution in order to present this data to users and third party systems, such that they have more data regarding the primary reasons or causes for transmitting of certain content to certain users.

Embodiments include an online system that identifies seed users with a high value score to a third party system, the value indicating a benefit provided to the third party system by the seed user. The online system identifies features of each of the seed users, the features describing data related to the seed users (e.g., demographic information, actions performed, browsing history, etc.). A weight for each of the identified features is identified, the weight for each identified feature computed based how much an identified feature increases the value of a user of the online system having that identified feature to the third party system.

The identified features are divided into a plurality of buckets or groups, each bucket indicating a property associated with one or more of the identified features, the plurality of buckets having non-overlapping identified features. Each bucket is ranked according to the weights of the identified features in each bucket.

The online system identifies one or more additional users that have a threshold measure of similarity to the seed users. The measure of similarity of the additional user is determined based at least in part on features of the additional user matching the identified features associated with the seed users. Based on this determination, the online system ultimately transmits a content item received from the third party system to a computing device of the additional user for presentation on a display unit of the computing device of the additional user.

Additionally, in some embodiments, the online system transmits one or more third party-presentable factors based on the bucket having the highest rank for the third party system, the third party-presentable factors indicating to the third party system a reason as to why the additional user was presented with the content item. In some embodiments, the online system provides feedback to a user receiving the content item about why that user received the content item or why the user was included in a target group for that content item.

Using the process described herein, the complexity behind the determination of additional similar users to a group of seed users can be summarized into a primary reason that is semantically meaningful and user-friendly, and which can be presented to the third party system or to a user being presented with the content item and allow the recipient of the information to understand why the user was selected for distribution of the content item.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
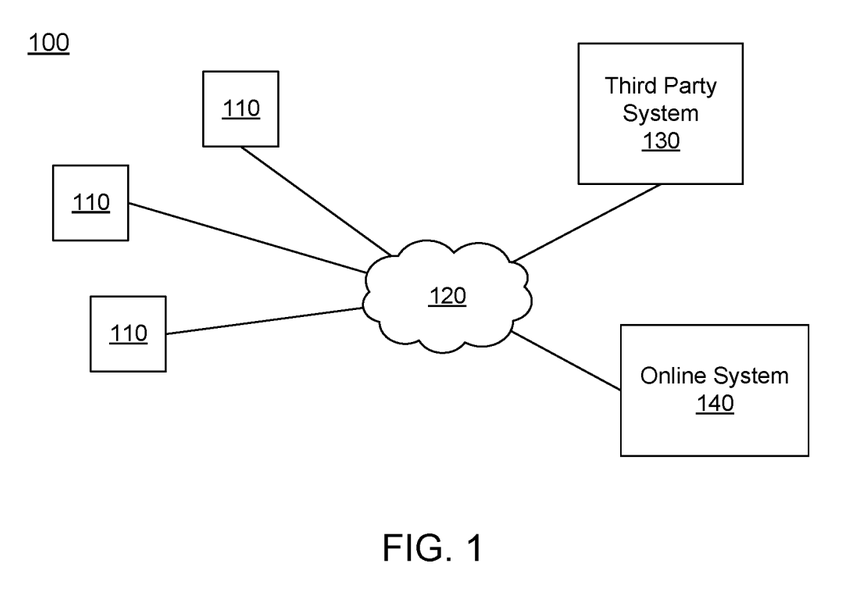
FIG. 1 is a high level block diagram of a system environment for an online system, according to an embodiment.

FIG. 1 is a high level block diagram of a system environment 100 for an online system 140, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130. Specifically, in one embodiment, a third party system 130 communicates content to the online system 140 for display to users of the client devices 110. The content may be created by the entity that owns the third party system 130. Such an entity may be an advertiser or a company producing a product or service that the company wishes to promote. In another embodiment, the third party system 130 is able to access a user interface of the online system 140 that allows the third party system 130 to view, for different content distribution opportunities, one or more primary factors indicating the reasons for which the content was distributed to certain users, as determined by the online system 140. Additional details regarding this functionality are described below.

Figure 2:
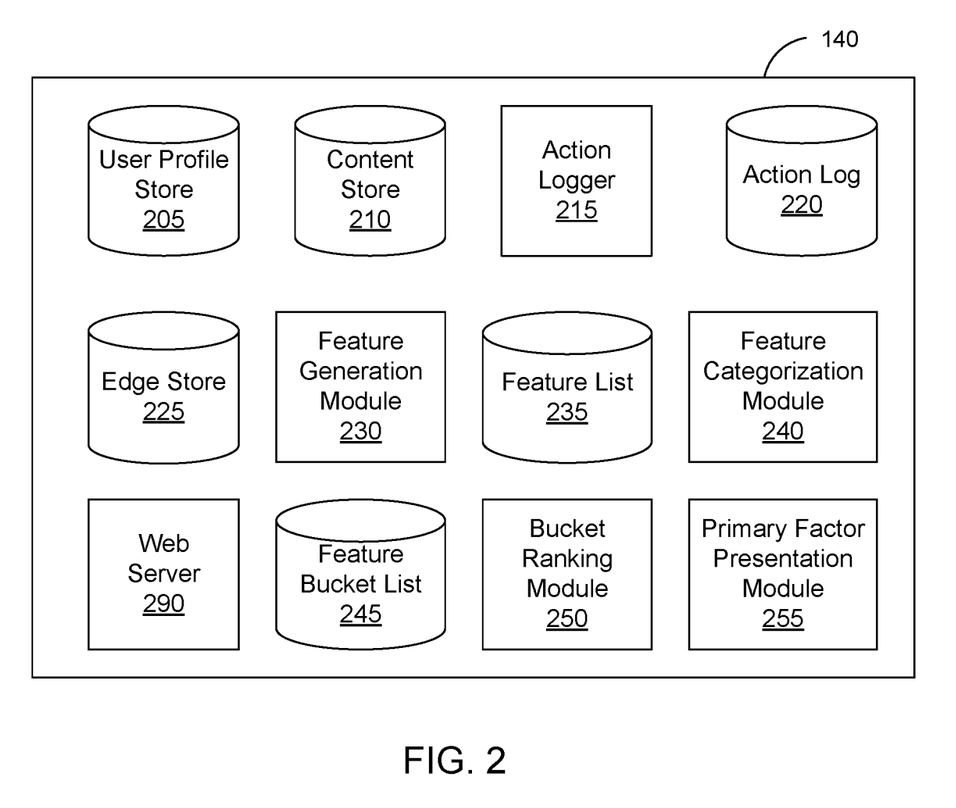
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a feature generation module 230, a feature list 235, a feature categorization module 240, a feature bucket list 245, a ranking module, a primary factor presentation module 255, and a web server 290. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

In one embodiment, the content store 210 may also include content items received from third party systems 130. These content items (e.g., video, audio, text, interactive content, etc.) may be associated with various metadata as selected by the third party system 130. This metadata may include tags describing the content item, features and/or features describing users for which the third party system 130 would like the content items to be distributed to, and in some cases, an indication of a compensation amount to be transmitted to the online system 140 for the opportunity to present the content item to a user of the online system. The features and/or features may describe various profile information of the user, as stored in the user profile store 205 (described above) and/or may describe actions performed by users within and external to the online system 140, as described in the action logger 215 and action log 220 (described below). If a user's profile information or performed actions match these features and/or features, that user may be selected for distribution of the content item. In one case, as described in further detail below, the third party system 130 may also identify a group of seed users and indicates to the online system 140 to distribute the content item to additional users of the online system 140 that are determined by the online system 140 to be similar to the seed users.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing features of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 245 links the online system 140 via the network 120 to the one or more client devices 110, as well as to the one or more third party systems 130. The web server 140 serves web pages, as well as other web-related content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or RIM®.

Feature Generation Module

The feature generation module 230 generates features and weights used to match additional users with a group of seed users provided by a third party system 130 based on a set of similar features shared between the additional users and the group of seed users. The seed users are users that are expected to have the highest value score for an entity's content. Those users with the highest value may be those users within a top percentage rank in user value. The value of a user may be measured in terms of return on investment (ROI) for the third party system 130 for that user (e.g., how much revenue the user generates vs. the cost to present the content to the user).

In one embodiment, the feature generation module 230 initially identifies the seed users in order to determine the set of features associated with the seed users. The feature generation module 230 identifies these users based on information provided by the third party system 130 for a content item. In another embodiment, the feature generation module 230 identifies these users based on other aspects, such as the actions of users of the online system with regards to a content or other similar content.

After identifying these seed users, the feature generation module 230 identifies features for these seed users. A feature is data that is or describes some information related to the seed user. The features for each seed user may describe various actions that a seed user has performed with regard to the online system 140. Examples of such actions may include posts that the user has commented on and links that the user has shared, etc. A feature may include information about the user in the user profile store 205, content store 210, action log 220, and edge store 225. A feature may describe other aspects of the seed user, and may in some cases be provided by the third party system 130.

The features identified by the feature generation module 230 may be selected from a template list of features stored by the online system 140. This template list may include all identifiable features available to the online system 140. This template list may be generated automatically by the online system 140 based on all available system variables of the online system 140 or based on expert selection. The feature generation module 230 may select features from the template list of features that are applicable to the group of seed users. These applicable features may be those that are available or applicable to the seed users. For example, some features in the template list of features may apply only to pages or non-user entities in the online system 140 (e.g., the online system itself) and are thus not applicable to the users. As another example, some features may only be applicable for data sourced from the third party system (e.g., third party system ROI), whereas the seed users may have been identified locally at the online system 140, and not have such associated data.

Examples of features may include demographic information of users, geographic information of users (e.g., zip code), pages that the user has visited, actions performed in the online system 140 (e.g., liking, posting comments, uploading content, etc.), the user's connections in the online system 140, the user's media consumption history, the user's browsing history including time spent by the user, internal metrics (e.g., data usage, device type usage, etc.), and so on.

The feature generation module 230 assigns weights to each identified feature. After each feature is weighted, the list of identified features with weights can be used to determine a list of additional users (i.e., users that are not seed users) of the online system 140 which share a measure of similarity with the seed users. Specifically, those additional users that have features that match more of the identified features than other users in the online system 140 are more likely to be similar to the seed users, and those additional users that have features that match the more highly weighted features in the list of identified features are even more likely to be similar to the seed users. Thus, the weighting of each feature determines how similar an additional user is to the seed users when the additional users matches that feature, with a higher weight indicating a higher similarity, and thus a higher likely value for that additional user to the third party system 130. In other words, the weight of each identified feature can be considered to be computed based on how much an identified feature increases the value of an additional user with that feature to the third party system 130.

To determine the weighting of each identified feature, the feature generation module 230 may utilize a predictor model to generate the weights. To train the predictor, the feature generation module 230 may use as training data the historical data for the third party system 130. The historical data includes prior presentations of content items from the third party system 130 to users of the online system 140. For each of these past presentations, the feature generation module 230 determines which features of the user in the historical data match the identified features of the seed users, and the value provided by the same user in the historical data.

The matching features include those features that match between the seed users the user identified in the historical data. For example, a user in the historical data that was selected may have as a zip code feature that matches a zip code of one or more of the seed users. Additional features may also match between the additional user and one or more of the seed users. The user in the historical data also has an associated value. This value, as noted, is the value to the third party system 130 for the additional user, and may be information received from the third party system 130. As the training data is derived from the historical data, the value for the user should already be known (in most cases) as the user may have performed some action at the third party system 130 to allow the third party system 130 to measure the user's value. The predictor model is trained iteratively by the feature generation module 230 using this training data to determine which features of a user, when matching the same features of the seed users, cause the highest increase in value for that user (i.e., which features, when matching, or when sharing a range, cause the resulting value to be impacted, or increased, the most). The predictor model, after training, assigns higher weights to those features that are most predictive of the resulting value for a user.

In some cases, the historical data may be filtered when used as training data. For example, the historical data may be filtered by content item content type (e.g., video, audio), content item placement (e.g., banner, inline, etc.), the category of the content item (e.g., if the content item is for a product, a service, is a discount offer, indicates a special pricing, a message, etc.), and so on. The filtering of the historical data allows for the training data that is selected to be a better fit for the prediction of the feature weights, as different feature weights sets may be predicted for combinations of seed users, third party systems 130, and content item types, etc.

Note that initially the users used for the historical data may be selected poorly, i.e., they are selected based on matching features that do not necessarily result in high value users. However, as the feature weights are improved through iterations of training, better users with higher value are selected, and the training data is also thusly improved. For example, once the predictor model is trained to determine an initial set of feature weights, another training set of data is collected, with the users in this second training set selected based on features determined to have high feature weight. Hence, those users that have features with relatively high feature weights are selected (e.g., feature weights that are within the top 10% or above a threshold). The value of these users to the third party system 130 is then used as an indicator to further refine the feature weight values, and this process is repeated, e.g., until the change in the feature weights between iterations is below a threshold value.

In other embodiments, the feature generation module 230 may use another method to determine the weights of each feature. For example, the weights may be determined by an expert system, via logistic regression, linear regression, other statistical methods, other machine learning models, and so on.

After determining the weights for each feature, the feature generation module 230 generates the feature list 235 for the third party system 130 to include the identified features and their respective weights. A different feature list may be generated based on different combinations of third party systems 130, sets of seed users, content item type/category/placement/etc. For example, a feature list may be generated specifically for a specific third party system 130 and a specific group of seed users. When generating such a feature list for a specific combination, the historical data that is used as training data may be filtered to only include relevant data that match the constraints posed by the combination. Thus, for a combination indicating a specific third party system 130, only historical data related to that third party system 130 may be selected as training data.

Feature List

The feature list 235 is a list of features and associated weights that may be generated for each combination of seed users, third party system 130, and content, as described above. For each feature list, the weights may be normalized such that they add up to 100%. As typically there may be hundreds or thousands of features, many of the features in the feature list 235 may have a weight that is in the single percentage range or below. The online system 140 may utilize the feature list to determine in real time whether a candidate user of the online system 140 is similar to the seed users that were used to generate the feature list with the associated weights (as described above). For each feature of the candidate user that matches (or matches within a range of) a feature in the feature list, the online system 140 adds the weight value for the feature to a running total for the candidate user. After parsing through all features in the feature list that have matching features associated with the candidate user, the running total represents a measure of similarity for the candidate user. If that candidate user has a score that is within a top number of users (e.g., 1% of users of the online system), that candidate user may be considered an additional user that has a threshold measure of similarity to the seed users associated with the feature list. In this fashion, the online system 140 may be able to identify additional users that are similar to the seed users using a computer-implemented process that can detect subtle connections between users that may not be detectable using manual analysis alone.

Additional methods of identifying additional users based on similarity to a seed group of users are further described in U.S. patent application Ser. No. 13/297,117, filed on Nov. 15, 2011, U.S. patent application Ser. No. 14/290,355, filed on May 29, 2014, U.S. patent application Ser. No. 14/719,780, filed on May 22, 2015, all of which are hereby incorporated by reference in their entirety.

Furthermore, the third party system 130 may have indicated that content item(s) from the third party system 130 should be distributed to these additional users. Thus, in response to determining that the candidate user is an additional user having threshold similarity to the seed users, the online system 140 may present the content item(s) from the third party system 130 to the additional user.

Feature Categorization Module

The feature categorization module 240 divides the features in a feature list 235 into one or more buckets, with each bucket indicating a semantically meaningful property shared by some of the features in the feature list 235. Note that as described above, additional users may be selected based on a score (the running total) measuring the similarity between the additional users and the seed users according to the weights and features of a feature list. The properties of each bucket are selected to assist a third party system 130 in determining a reason for why certain additional users were selected. The properties are also selected to assist a user in determining why a content item was presented to the user.

Each feature in the feature list 235 may have many properties. These properties describe an aspect of the feature itself or describe an aspect of the data upon which the feature is based. If a property describes a feature, then the feature can be said to belong to the property, be associated with the property, or have that property. Some properties may include, but are not limited to: 1) the data source of the data upon which the feature is based (e.g., sourced from activity within the online system, from activity outside the online system, from the third party system, or from the user profile data); 2) what entity is described by the data (e.g., the user, the third party system, or the online system); and 3) the type of action described by the feature, such as those actions described above with reference to the action logger 215 and action log 220 (e.g., actions external to the online system 140, actions within the online system 140, actions related to non-user entities, actions related to users, etc.).

Other properties may also be used that may assist either the third party system 130 or a user determine why the user was presented with a particular content item, and such a property is selected so that it can provide the third party system 130 or user with a capability to predict a primary factor indicating a reason why the user was presented with a particular content item. Using this property, the third party system 130 or user may also be able to further estimate whether other users would be likely to be presented with the same content item. Thus, the property should be semantically meaningful in describing information about the user, the content item presented to the user, the third party system 130 that provided the content item, or some metadata regarding one of these three.

Note further that some properties are shared among multiple features. For example, a property related to actions outside the online system may describe multiple features, for example a feature that indicates the websites visited by a user outside the online system, or a feature that indicates time spent by the user outside the online system on other systems.

In one embodiment, each property may be selected such that each feature is only associated with a single property and not with multiple properties, i.e., the properties are mutually exclusive. For example, if the property is actions outside the online system, features that are associated with this property would not be associated with any other selected property. For example, if another property is actions performed by the user within the online system, one can see that a feature could be associated with either property but not both (i.e., features related to an action within the online system would naturally not be an action external to the online system).

The feature categorization module 240 may select the properties using an expert system. Alternatively, the feature categorization module 240 may select the properties automatically. To do this, each feature may already be associated with multiple properties. These properties may be defined in a template feature list, as described above with reference to the feature generation module 230. The feature categorization module 240 may determine various combinations of properties that are mutually exclusive (i.e., such that features would not be described by multiple properties). Among these combinations, the feature categorization module 240 may remove those combinations where each property only describes a few features (e.g., below a threshold) or where there are a large number of properties selected (e.g., more than a threshold number). The feature categorization module 240 may also drop those combinations where the properties are related to internal metrics, proprietary trade secrets, or other information that would not be public-facing. Among the remaining combinations, the feature categorization module 240 may select those that have properties that are inclusive of the most number of features (i.e., such that the number of properties selected in the combination are the smallest number amongst all the combinations), or at least have a threshold number of properties from a mandatory set of properties that have been previously selected and were determined to be semantically meaningful. For example, this mandatory set may be selected by the third party system 130.

The feature categorization module 240 selects properties until all identified features are described by the selected combination of properties, or when a threshold percentage of the identified features are described (e.g., 95%). For example, in one method, feature categorization module 240 selects a property that has the most number of associated features in the list of identified features. The feature categorization module 240 then selects a second property (if any) that has the second most number of associated features in the list of identified features. This continues until no features remain (or a threshold percentage of features are assigned to properties). This should result in a list of properties which are compact and which include a large number of features to each property.

After selecting the properties to be used, the feature categorization module 240 assigns a bucket for each property, and categorizes each identified feature into the appropriate bucket based on its property. Thus, for example, a feature about the user (e.g., the user's age range) may be placed in a bucket that has been assigned the property of "features that describe the user," and a feature about the third party system (e.g., the location of the third party system) may be placed in a bucket that has been assigned the property of "features that describe the third party system." Note that in this case, these two buckets would be mutually exclusive with regards to which features are placed into which bucket (i.e., features that describe the user should not also be describing the third party system).

After categorizing the features from the feature list 235 into the buckets, the feature categorization module 240 stores the buckets and their features into a feature bucket list 245.

Feature Bucket List

The feature bucket list includes the buckets generated by the feature categorization module 240 with each bucket assigned to different properties, and with each bucket having features which have the assigned property of the bucket. As described above with reference to the feature categorization module 240, the property assigned to each bucket is shared amongst multiple identified features of the feature list 235. The resulting list of buckets categorizes what may include hundreds or thousands of features into a smaller number of buckets. While many of the features may have been difficult to parse semantically, the buckets place these features into broader categories which may be more easily parse-able and, upon ranking, as described below, can provide sufficient meaning to a third party system 130 or user in regards to a primary factor for presenting a content item to a user.

Bucket Ranking Module

The bucket ranking module 250 ranks each bucket in the bucket list 245 according to the weights of the features within each bucket. To weight the buckets, in one embodiment, the bucket ranking module 250 adds the weights of the features within each bucket, and determines a cumulative score for each bucket that includes the sums of all the weights of all the features within each bucket. The bucket ranking module 250 may then select the bucket with the highest score, and expose this to the primary factor presentation module 255, or alternatively rank the buckets according to their scores, with the bucket having the highest score ranked first, the bucket having the second highest score ranked second, and so on.

As noted above, a score for a candidate user is based on the sum of the weights of identified features that match to the candidate user, with a higher score indicating a higher similarity between the candidate user and the seed users. Thus, semantically, the bucket with the highest score has the assigned property that was most likely the reason for the candidate user being selected as being similar. For example, if the highest ranked bucket has the property of actions performed outside the online system 140, then the process described here and performed by the online system 140 has determined that the actions performed by the candidate user outside the online system 140, and logged by the online system 140, has most likely contributed to the user being selected as being similar to the seed users associated with the particular feature list 235.

Primary Factor Presentation Module

The primary factor presentation module 255 presents a user-presentable (i.e., user-friendly) factor to a user and/or a third party-presentable factor to a third party system 130, with the presentable factor indicating to either the user or the third party system 130 a primary reason for why the user was selected for distribution and presentation of a particular content item from the third party system 130.

The user-presentable factor and/or the third party-presentable factor may be based on 1) features in the highest ranked bucket in the feature bucket list 245, may be based on 2) a set of rules instructing the primary factor presentation module 255 to manipulate feature data and generate a derived factor, or may be based on 3) the property of the highest ranked bucket itself, as described below.

In the first case, once the buckets in the feature bucket list 245 are ranked, the primary factor presentation module 255 selects one or more features from the highest ranked bucket and uses the selected feature as a basis for presenting to either the third party system 130 or a user a primary factor indicating the reason as to why the user was presented was a specific content item from the third party system 130.

To achieve this, the primary factor presentation module 255 selects from the highest ranked bucket the feature in the bucket with the highest weight. For example, if the highest ranked bucket is the bucket with the property of "features with data sourced from actions within the online system," the feature with the highest weight within that bucket may be a feature that lists a page in the online system 140 that is visited at a high frequency (e.g., beyond a threshold level). As noted above, the feature for the user should match the feature for the seed users for that user to be selected as an additional user with a threshold measure of similarity to the seed user. Thus, both the user and the seed users should have visited that page of the online system 140 at a high frequency. The primary factor presentation module 255 may present this feature to the third party system 130 and to the user as the primary factor for why the user was presented with the content item from the third party system 130, i.e., that the user visited a page at a high frequency.

The primary factor presentation module 255 may not directly present the details of the highest weighted feature to the third party system 130 or the user, as the raw data from the feature may not be user-friendly. Instead, a user-friendly template may exist for each feature which can be exposed to the user or the third party system 130 (i.e., those that are not filtered out). The template may include user-friendly descriptions along with variables which are to be substituted with the information from the feature. The primary factor presentation module 255 may access this template, substitute the variables with the information from the feature, and present this to the user and/or third party system 130. For example, using the example above, the template for the particular feature may indicate that "The user was selected because the user has visited page $page at a high frequency." The primary factor presentation module 255 would substitute the variable $page with the actual page listed in the feature, and present this user-friendly information to the third party system 130 or user. Different templates may be used for the user and the third party system 130, resulting in a user-presentable factor and a third party-presentable factor. For example, the description provided to the third party system 130 may include additional technical details extracted from the feature data.

In the second case, in one embodiment, the primary factor presentation module 255 may not present the data from the feature directly as in the first case, but may base a presented factor on one or more features selected from the highest ranked bucket in accordance with a set of pre-existing rules. Based on the set of pre-existing rules which indicate to the primary factor presentation module 255 to present specifically constructed information when certain combinations of features are encountered within a bucket, the primary factor presentation module 255 may determine whether these features have been placed in the bucket, and in response, present the specifically constructed information. The rules may indicate to the primary factor presentation module 255 on how to present the specifically constructed information. For example, one rule may indicate that if features describing age or gender exist in the bucket, then the primary factor presentation module 255 should indicate the primary factor being that the user was selected for distribution of the content item because he or she matched certain demographic criteria. This hides personally identifiable information from being exposed. Another rule may indicate that if a feature indicates any information about a competitor of a third party system 130, that information about the competitor should be scrubbed before presenting the primary factor to the third party system 130. The information about competitors may be stored in a database that can be accessed by the primary factor presentation module 255 and instructions for how to parse such a database may be encoded in the rules.

In the third case, in one embodiment, the primary factor presentation module 255 may present the primary factor to the third party system 130 and/or user based on the property assigned to the highest ranked bucket rather than the features within the bucket. In one case, the primary factor presentation module 255 may present the primary factor based directly upon the property of the bucket. For example, if the property of the bucket is "features with data sourced from the third party system," then the primary factor presentation module 255 may indicate that the user was presented with the content item due to "data sourced from the third party system." In other words, the primary factor presentation module 255 may use the property data directly in presenting the primary factor. In another case, the primary factor presentation module 255 may be instructed by pre-existing rules to present a primary factor to the third party system 130 and/or user based upon the type of property of the bucket. In particular, if the bucket has a property describing actions, e.g., "actions performed within the online system 140," the primary factor presentation module 255 may be instructed by the rule to determine the most frequent action performed by the user that matches the property, e.g., commenting on a specific page X within the online system 140. The rule may further instruct the primary factor presentation module 255 to present this action as the primary factor to the third party system 130 and/or user. Thus, in the above example, the primary factor presentation module 255 may present the primary factor as "the reason the user was presented the content is because the user commented on the specific page X."

The primary factor presentation module 255 may present the primary factor using a variety of user interfaces, and may use different user interfaces depending upon whether the presentation is to the third party system 130 or to the user.

In the case of the third party system 130, the primary factor presentation module 255 may present the information via a reporting user interface. The primary factor presentation module 255 may receive input from the third party system 130 selecting individual users who have been presented with content or who are selected by the online system 140 to be presentable with the content because of their similarity to the seed users. The primary factor presentation module 255, upon receiving the input, may present a message to the third party system 130 via the reporting user interface indicating the primary factor as determined according to the process described above.

In the case of the user, when the user sees the content item presented to the user in a user interface of the online system 140 (e.g., in a newsfeed interface, a notifications interface, a page display interface, etc.), the primary factor presentation module 255 may also expose a user interface element, such as question mark icon, a clickable text link (e.g., which says "Why am I seeing this?"), which, when interacted with by the user, causes the primary factor presentation module 255 to display to the user in a secondary user interface element (e.g., a pop-up box, an inline element, etc.) the primary factor for the user being presented the content item, as determined using the process described above.

The primary factor presentation module 255 may also expose the primary factors as determined using the process described above in an application programming interface (API) available to certain third party systems 130. In such a case, the primary factors may be coded according to a mutually agreed upon standard, such that the factors are more easily computer parse-able. This data may be used by the third party system 130 to modify its selection of seed users, content items, and other factors, so that the third party system 130 may discover higher value users or for some other purposes. Additional details regarding the processes and systems described above are described with further detail below with reference to FIGS. 3-4.

Exemplary Advantages

Using the process described here, the complexity behind the determination of additional similar users to a group of seed users can be summarized into a primary reason that is semantically meaningful and user-friendly and which can be presented to the third party system 130 or to a user being presented with the content item and allow the recipient of the information to understand why the user was selected for distribution of the content item. This "demystification" of the similarity determination process may allow users to better understand why they were selected for certain content items, and make appropriate decisions as a result, and can help the third party system 130 better determine how to select users for distribution of content items.

Additional Methods for Seed User Identification

Additional methods for the identification of seed users are described herein. These methods may be used in some embodiments by the online system 140 to identify seed users for use by the feature generation module 230 in generating the feature list 235 for the seed users. In one embodiment, to identify the seed users the online system 140 receives information from the third party system 130 directly identifying a plurality of users as seed users. This information includes any information that may uniquely identify a user, such as an email address, social network username, unique identifier, contact information, address, phone number, name, and so on. For example, the third party system 130 may provide to the online system 140 a list of email addresses associated with users that the third party system 130 considers to be of high value. Once the online system 140 has the list of users, the system can identify or determine the identity of these users by matching them to user profiles stored in the user profile store 205 (assuming the users on the list from the third party system 130 are also users of the online system and hence have user profiles in the online system). For example, the online system 140 can match the email address of a user to the email address in the user profile store to determine that it is the same user, and thus the system now has additional identifying information about that user (e.g., the information in the user profile). In some cases, not all of users are users of the online system, in which case the online system 140 may be unable to identify certain of the users within the online system. These users may be excluded from the seed user group.

In one embodiment, to identify these seed users, the online system 140 receives identifiers from the third party system 130 that may be used to identify the seed users. The third party system 130 uses a hash function to create a secure identifier hash for each of the users the third party system 130 identifies as seed users. This secure identifier hash does not include personally identifiable information for the user. The third party system 130 then transmits the generated secure identifier hashes to the online system 140. The online system 140 uses an equivalent hashing module to create a locally generated secure identifier hash for users of the online system 140. If the locally generated secure identifier hash matches any of the secure identifier hashes received from the third party system 130, the user of the online system 140 that is identified by the locally generated hash is identified as a seed user.

Methods of identifying users by a third party system are further described in U.S. patent application Ser. No. 13/306,901, filed on Nov. 29, 2011, U.S. patent application Ser. No. 14/034,350, filed on Sep. 23, 2013, U.S. patent application Ser. No. 14/177,300, filed on Feb. 11, 2014, and U.S. patent application Ser. No. 14/498,894, filed on Sep. 26, 2014, all of which are hereby incorporated by reference in their entirety.

In one embodiment, the online system 140 itself identifies seed users (or users expected to be of high value to the third party) without input by the third party system 130. The online system 140 can do this by, for example, determining if the actions performed by users after being presented with the content from the third party system 130 exceed a specified metric.

The actions performed by the users are logged by the online system 140 as described above, and can include actions such as liking, sharing, and otherwise engaging with the content or objects in the online system 140 that are related to the content. In one embodiment, the objects that are related to the content are within a certain degree of connections to the content. The connections may be stored as edges of the online system 140 as described above.

The actions may also include actions performed outside the online system 140 regarding the content, such as installing an application on a client device that was promoted by the content, visiting a web page or other location promoted by the content, and so on. This information may be provided by the third party system 130 or tracked by the online system 140 using a tracking identifier placed on the user's client device.

The online system 140 determines if the actions performed exceed a certain metric. The metric may be a threshold count of actions, a threshold number of actions made against the content, a threshold number of actions performed outside the online system 140, and/or any other relevant metric that may be used to measure the value of the user in response to being presented by the content.

The metric may be an amount of profit (e.g., ROI) generated by the user' actions for the third party system 130 as a result of being presented with the content. In one embodiment, the ROI for users is calculated by the third party system 130 and provided to the online system. The online system 140 identifies the users of the online system that match the users provided by the third party system 130 (e.g., by matching features of the user's profile with the information provided by the third party system 130), and selects those users that exceed a certain ROI value (e.g., top 1% of ROI among the ROI values provided) as the seed users.

In one embodiment, the third party system 130 provides the online system 140 with estimated revenue for certain types of actions related to the content, and the online system 140 calculates the estimated revenue for each user based on the actions performed by that user. Those users that exceed a certain estimated revenue are then selected by the online system 140 as seed users.

Figure 3:
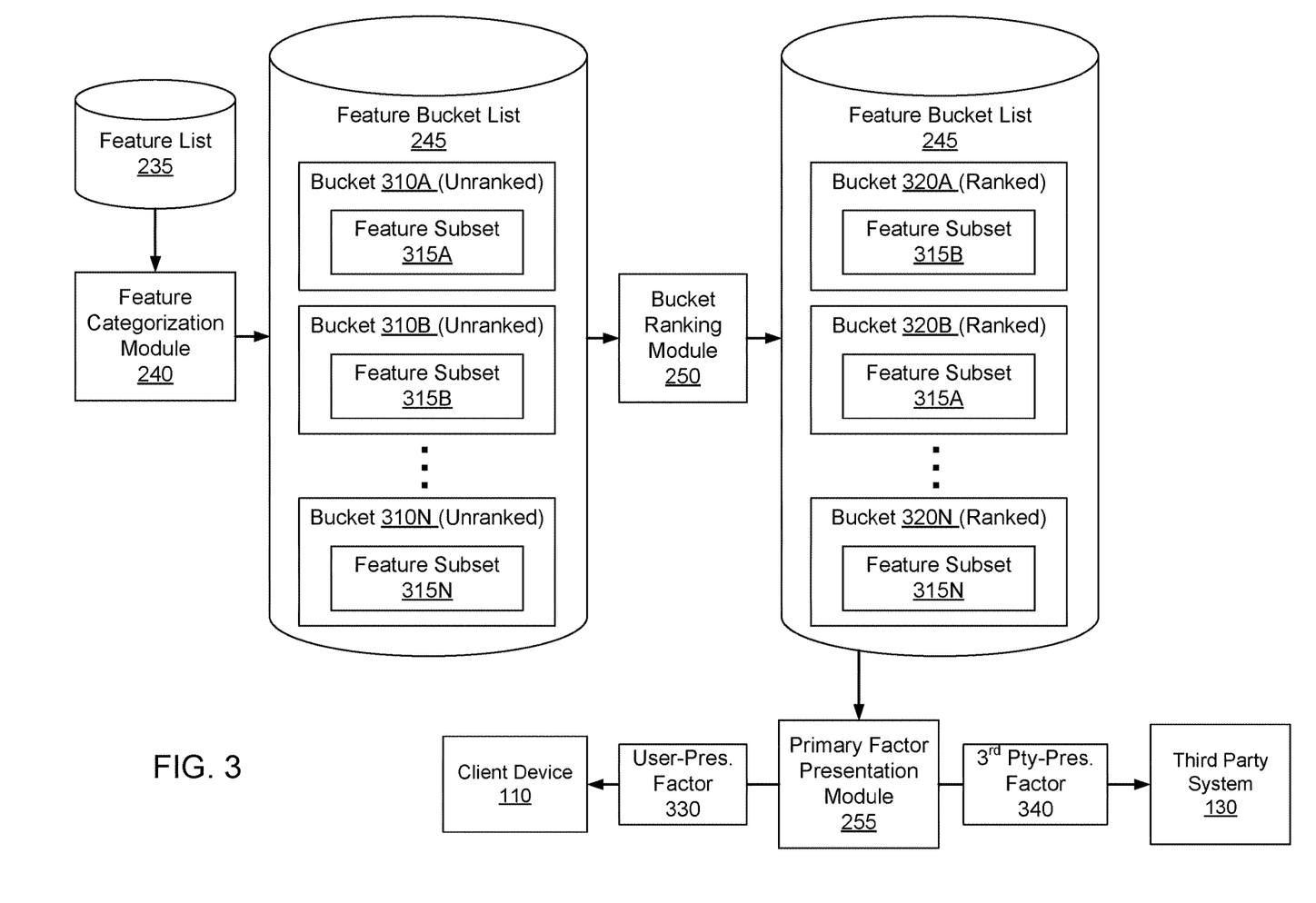
FIG. 3 is a combined data structure and data flow diagram illustrating the process of presenting primary factors for why a user was selected for distribution and presentation of a particular content item from a third party system, according to an embodiment.

Data Structure and Data Flow Diagram Illustrating Process of Presenting Primary Factors for why a User was Selected for Distribution and Presentation of a Particular Content Item from a Third Party System FIG. 3 is a combined data structure and data flow diagram illustrating the process of presenting primary factors for why a user was selected for distribution and presentation of a particular content item from a third party system, according to an embodiment. In other embodiments, the process may include different and/or additional steps than those described in conjunction with FIG. 3. Additionally, in some embodiments, the process may be performed in a different order than the one described in conjunction with FIG. 3.

Initially, the online system 140 generates or accesses the feature list 235. The feature list 235 may be generated by the feature generation module 230, as described above with reference to FIG. 2. As noted above, a feature list 235 may be generated for a specific set of seed users. Furthermore, each feature includes a weight describing the importance of that feature when used to determine a similarity between a candidate user and the group of seed users for which the feature list 235 was created. If a candidate user is determined to be similar to the seed user, a content item from the third party system may be presented to that candidate user (this may only occur if that third party system's provided compensation for the presentation of the content item exceeds the compensation provided by other third party systems whose seed users also have a threshold measure of similarity to the candidate user).

In a first stage, the feature list 235 is categorized into a number of buckets by the feature categorization module 240. As described above, this creates a feature bucket list 245 that includes a number of buckets 310A-N (unranked). Each bucket is assigned a property, and the features in each bucket, which comprise a features subset 315 for each bucket, have that assigned property. For example, as noted above, one property may be "features related to actions performed by users within the online system."

In a second stage, the bucket ranking module 250 ranks the feature bucket list 245 to create a feature bucket list 245 that includes a list of ranked buckets 320A-N. As noted above, the bucket ranking module 250 may rank each bucket according to the weight of the features within each bucket. Those buckets with features having higher weights may be ranked higher. In the illustrated example, the highest ranked bucket is bucket 320A.

After the buckets are ranked into the ranked buckets 320, the primary factor presentation module 255 presents a primary factor (or multiple factors) to the client device 110 associated with an additional user for which a content item was presented and who was determined by the online system 140 to have a threshold measure of similarity to the seed users associated with the feature list 235. The primary factor indicates a reason for why the content item was presented to the additional user. The primary factor presentation module 255 also presents a primary factor to the third party system 130 which provided the content item. Thus, as described above, the primary factor presentation module 255 may transmit a user-presentable factor 330 to the client device 110, and/or a third party-presentable factor 340 to the third party system 130. The user-presentable factor 330 and the third party-presentable factor 340 may be selected by the primary factor presentation module 255 based on the highest-weighted feature in the highest ranked bucket 320A, based on rules instructing the primary factor presentation module 255 to operate on the features in the highest ranked bucket 320A, or based on the property of the highest ranked bucket 320A itself.

The user-presentable factor 330 is presented to the user via a user interface displayed to the user via the client device 110 of the user. The third party presentable factor 340 is presented via a reporting interface by the primary factor presentation module 255 to an administrator or other agent of the third party system 130.

Exemplary Flow

Figure 4:
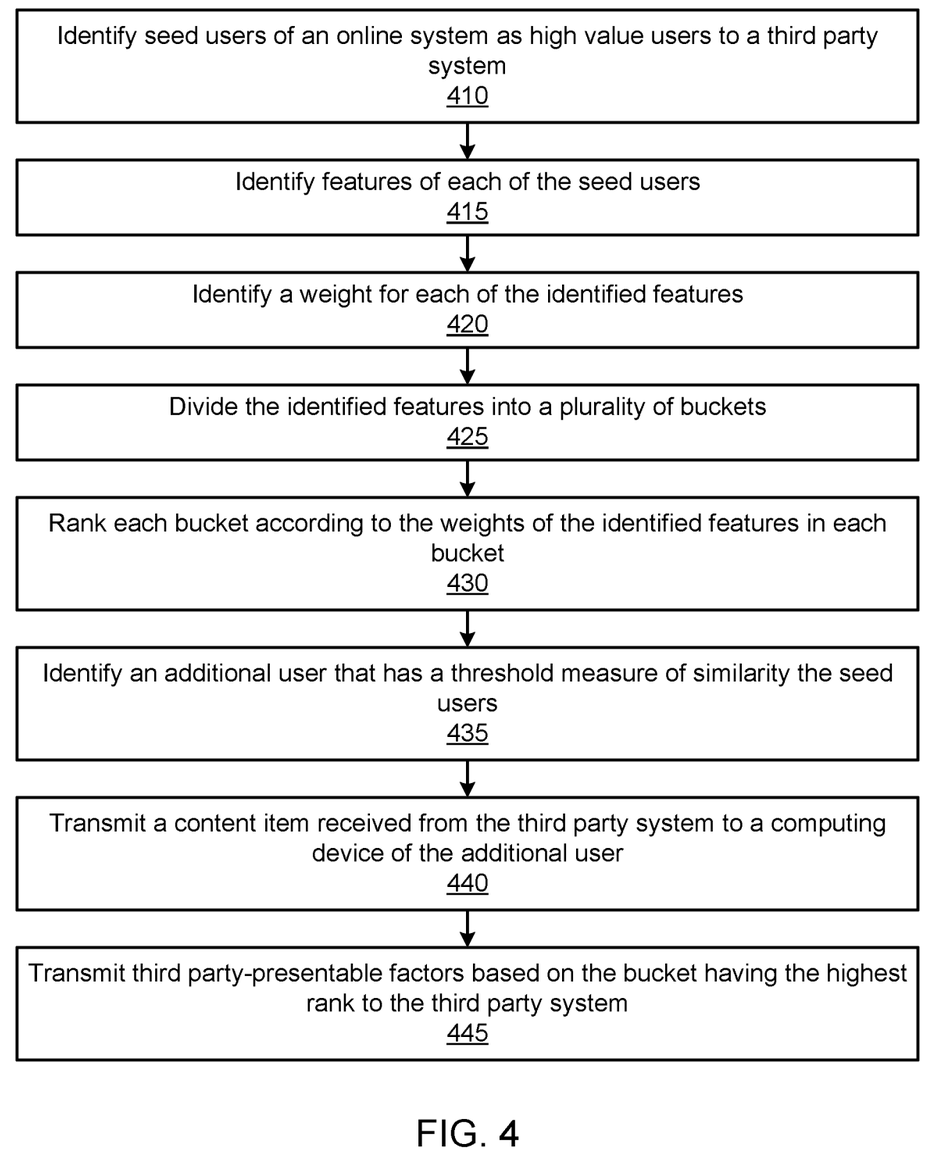
FIG. 4 is a flowchart of one embodiment of a method in an online system for the process of presenting primary factors for why an additional user was selected for distribution and presentation of a particular content item from a third party system, according to an embodiment.

FIG. 4 is a flowchart of one embodiment of a method in an online system for the process of presenting primary factors for why an additional user was selected for distribution and presentation of a particular content item from a third party system, according to an embodiment. In other embodiments, the process may include different and/or additional steps than those described in conjunction with FIG. 4. Additionally, in some embodiments, the process may be performed in a different order than the one described in conjunction with FIG. 4.

Initially, the online system 140 identifies 410 seed users of an online system as high value users to a third party system 130. The value for these seed users may be measured, for example, by the ROI of the users.

The online system 140 identifies 415 features of each of the seed users. These features may be selected from a template set of features and the features selected may be based on which features are present in the seed group of users.

The online system 140 identifies 420 a weight for each of the identified features. As described above, the weight for each feature may be determined according to a predictor model that determines based on historical data which features when matching between seed users and additional users of the online system was most indicative of a high value for the additional user to the third party system 130. The higher the value, the higher the weight for that feature. This process may be performed iteratively.

The online system 140 divides 425 the identified features into a plurality of buckets. As noted above, each bucket has a property, and features described by a property are put in the respective bucket for that property. In one case, the properties are mutually exclusive.

The online system 140 ranks 430 each bucket according to the weights of the features within each bucket. The weights of the features in each bucket may be added up, and the bucket with the highest cumulative score is ranked first, with remaining buckets ranked accordingly, as described above.

The online system 140 identifies 435 an additional user that has a threshold similarity to the seed users based on matching features of the additional user to a feature list for the seed users, as described above.

The online system 140 transmits 440 a content item received from the third party system to a computing device of this additional user. Based on the bucket having the highest rank for that third party system as determined by the online system 140 at 430, the online system 140 transmits third party-presentable factors to the third party for the presentation of the content item to the user at 440.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
identifying, as seed users, users of the online system with a high value score to a third party system, the value score of each user determined based on a measure of benefit provided by the user to the third party system due to presenting content from the third party system to the user;
identifying features of each of the seed users, the features describing data related to the seed users that are relevant to selecting content for the seed users, and wherein the features include a description of one or more actions performed by the seed users at the online system and profile information of the seed user that is retrieved from a user profile data store of the online system;
identifying, by the online system, a weight for each of the identified features, the weight for each identified feature computed based on how much an identified feature increases a value to the third party system of a user that has that identified feature when that user is presented with content from the third party system, as compared to another user without that identified feature;
dividing the identified features of each of the seed users into a plurality of buckets, each bucket having identified features that are associated with a property, the plurality of buckets having non-overlapping identified features;
ranking each bucket according to the weights of the identified features in each bucket;
identifying an additional user that has a threshold measure of similarity the seed users, the measure of similarity of the additional user determined based at least in part on features of the additional user matching the identified features associated with the seed users;
transmitting a content item received from the third party system to a computing device of the additional user for presentation on a display unit of the computing device of the additional user; and
transmitting, by the online system over a network to the third party system, one or more third party-presentable factors that are identified by the identified features of the bucket having the highest rank, the third party-presentable factors presented in a reporting user interface and indicating to the third party system a reason as to why the additional user was presented with the content item.

2. The method of claim 1, wherein the weight for each feature is computed using a predictor model, the training data for the predictor model comprised of historical data of prior content presentations to users of the online system, the users having features matching the identified features, and the predictor model generating weights for the features in proportion to the value score for the user identified in the historical data.

3. The method of claim 2, wherein the historical data is filtered such that only content presentations of a specific content item from the third party system to users of the online system are included in the historical data.

4. The method of claim 2, wherein the predictor model is trained iteratively based on additional training data, the additional training data comprised of additional historical data of additional content presentations to additional users of the online system, the additional users of the online system selected based on the weight of matching features of the additional users being within an indicated percentage value of the top weight values of the identified features as determined by the predictor model in the prior iteration.

5. The method of claim 1, wherein each property is at least one an identifier of a data source of the data for one or more feature, an identifier of an entity described by one or more features, and an identifier of a type of action described by one or more features.

6. The method of claim 1, wherein dividing the identified features into a plurality of buckets further comprises:
identifying the set of properties associated with the identified features, each feature having one or more associated properties;
selecting a first property associated with the most number of the identified features;
selecting additional properties having a most number of the remaining identified features not associated with a selected property;
assigning the first property to a first bucket;
assigning any additional properties to additional buckets; and
assigning the identified features by property to each bucket in accordance with the property associated with each bucket.

7. The method of claim 1, wherein the bucket with the highest rank is the bucket having a combined sum of the weights of the features assigned to each bucket that exceeds a combined sum of any of the other buckets in the plurality of buckets.

8. The method of claim 1, wherein the third party-presentable factor is based on at least one of: features in the highest ranked bucket, a set of rules indicating how to manipulate the features in the highest ranked bucket to present a derived data for the third party-presentable factor, and the property of the highest ranked bucket itself.

9. The method of claim 1, further comprising:
transmitting one or more user-presentable factors based on the bucket having the highest rank to the client device of the additional user, the user-presentable factors indicating to the additional user a reason as to why the additional user was presented with the content item.

10. The method of claim 1, wherein the user-presentable factors are presented inline to the user in a newsfeed user interface adjacent to the presentation of the content item.

11. A computer program product comprising a non-transitory computer readable storage medium having instructions encoded thereon that, when executed by a processor, cause the processor to:
identify, as seed users, users of the online system with a high value score to a third party system, the value score of each user determined based on a measure of benefit provided by the user to the third party system due to presenting content from the third party system to the user;
identify features of each of the seed users, the features describing data related to the seed users that are relevant to selecting content for the seed users, and wherein the features include a description of one or more actions performed by the seed users at the online system and profile information of the seed user that is retrieved from a user profile data store of the online system;
identify, by the online system, a weight for each of the identified features, the weight for each identified feature computed based on how much an identified feature increases a value to the third party system of a user that has that identified feature when that user is presented with content from the third party system, as compared to another user without that identified feature;
divide the identified features of each of the seed users into a plurality of buckets, each bucket having identified features that are associated with a property, the plurality of buckets having non-overlapping identified features;
rank each bucket according to the weights of the identified features in each bucket;
identify an additional user that has a threshold measure of similarity the seed users, the measure of similarity of the additional user determined based at least in part on features of the additional user matching the identified features associated with the seed users;
transmit a content item received from the third party system to a computing device of the additional user for presentation on a display unit of the computing device of the additional user; and
transmit, by the online system over a network to the third party system, one or more third party-presentable factors that are identified by the identified features of the bucket having the highest rank, the third party-presentable factors presented in a reporting user interface and indicating to the third party system a reason as to why the additional user was presented with the content item.

12. The computer program product of claim 11, wherein the weight for each feature is computed using a predictor model, the training data for the predictor model comprised of historical data of prior content presentations to users of the online system, the users having features matching the identified features, and the predictor model generating weights for the features in proportion to the value score for the user identified in the historical data.

13. The computer program product of claim 12, wherein the historical data is filtered such that only content presentations of a specific content item from the third party system to users of the online system are included in the historical data.

14. The computer program product of claim 12, wherein the predictor model is trained iteratively based on additional training data, the additional training data comprised of additional historical data of additional content presentations to additional users of the online system, the additional users of the online system selected based on the weight of matching features of the additional users being within an indicated percentage value of the top weight values of the identified features as determined by the predictor model in the prior iteration.

15. The computer program product of claim 11, wherein each property is at least one an identifier of a data source of the data for one or more feature, an identifier of an entity described by one or more features, and an identifier of a type of action described by one or more features.

16. The computer program product of claim 11, wherein the non-transitory computer readable storage medium has instructions encoded thereon for the division of the identified features into a plurality of buckets, that, when executed by a processor, cause the processor to:
identify the set of properties associated with the identified features, each feature having one or more associated properties;
select a first property associated with the most number of the identified features;
select additional properties having a most number of the remaining identified features not associated with a selected property;
assign the first property to a first bucket;
assign any additional properties to additional buckets; and assign the identified features by property to each bucket in accordance with the property associated with each bucket.

17. The computer program product of claim 11, wherein the bucket with the highest rank is the bucket having a combined sum of the weights of the features assigned to each bucket that exceeds a combined sum of any of the other buckets in the plurality of buckets.

18. The computer program product of claim 11, wherein the third party-presentable factor is based on at least one of: features in the highest ranked bucket, a set of rules indicating how to manipulate the features in the highest ranked bucket to present a derived data for the third party-presentable factor, and the property of the highest ranked bucket itself.

19. The computer program product of claim 11, wherein the non-transitory computer readable storage medium has instructions encoded thereon that, when executed by a processor, cause the processor to:
transmit one or more user-presentable factors based on the bucket having the highest rank to the client device of the additional user, the user-presentable factors indicating to the additional user a reason as to why the additional user was presented with the content item.

20. The computer program product of claim 11, wherein the user-presentable factors are presented inline to the user in a newsfeed user interface adjacent to the presentation of the content item.

* * * * *

UNITED STATES PATENT AND TRADEMARK OFFICE
CERTIFICATE OF CORRECTION

PATENT NO. : 10,853,428 B2  
APPLICATION NO. : 15/650118  
DATED : December 1, 2020  
INVENTOR(S) : Gianluca Iannaccone Page 1 of 1

It is certified that error appears in the above-identified patent and that said Letters Patent is hereby corrected as shown below:

On the Title Page

Item (51), in Column 1, under "Int. Cl.", Line 3, after "G06Q" delete "50/00" and insert -- 50/01 --, therefor.

Item (58), in Column 1, under "Field of Classification Search", Line 1, delete "None" and insert -- USPC ..................... 705/7.12, 7.11, 29; 235/376 --, therefor.

Item (56), in Column 2, under "Other Publications", Line 3, delete "95b1849302b9" and insert -- 95b8149302b9 --, therefor.

Item (57), in Column 2, under "Abstract", Line 10, after "similarity" insert -- to --.

In the Claims

In Column 20, in Claim 1, Line 31, delete "similarity the" and insert -- similarity to the --, therefor.

In Column 22, in Claim 11, Line 8, delete "similarity the" and insert -- similarity to the --, therefor.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*